(12) United States Patent
Nakano et al.

(10) Patent No.: US 9,236,651 B2
(45) Date of Patent: Jan. 12, 2016

(54) COMMUNICATION TERMINAL DEVICE

(71) Applicant: Murata Manufacturing Co., Ltd., Nagaokakyo-shi, Kyoto-fu (JP)

(72) Inventors: Shinichi Nakano, Nagaokakyo (JP); Hiroyuki Kubo, Nagaokakyo (JP); Kuniaki Yosui, Nagaokakyo (JP)

(73) Assignee: MURATA MANUFACTURING CO., LTD., Nagaokakyo-shi (JP)

( * ) Notice: Subject to any disclaimer, the term of this patent is extended or adjusted under 35 U.S.C. 154(b) by 313 days.

(21) Appl. No.: 13/760,196

(22) Filed: Feb. 6, 2013

(65) Prior Publication Data
US 2013/0147670 A1    Jun. 13, 2013

Related U.S. Application Data

(63) Continuation of application No. PCT/JP2011/073490, filed on Oct. 13, 2011.

(30) Foreign Application Priority Data

Oct. 21, 2010   (JP) ................. 2010-236127
Oct. 21, 2010   (JP) ................. 2010-236141

(51) Int. Cl.
*H01Q 1/24*     (2006.01)
*H01Q 7/06*     (2006.01)
(Continued)

(52) U.S. Cl.
CPC .......... *H01Q 1/243* (2013.01); *G06K 19/07773* (2013.01); *H01F 38/14* (2013.01); *H01Q 1/2216* (2013.01); *H01Q 1/521* (2013.01);
(Continued)

(58) Field of Classification Search
CPC ....... H01Q 1/243; H01Q 1/22; H01Q 1/2208; H01Q 1/2216; H01Q 1/2225
See application file for complete search history.

(56) References Cited

U.S. PATENT DOCUMENTS 3,364,564 A    1/1968   Kurtz et al.
4,794,397 A   12/1988   Ohe et al.
(Continued)

FOREIGN PATENT DOCUMENTS

CA         2 279 176 A1    7/1998
DE   10 2006 057 369 A1    6/2008
(Continued)

OTHER PUBLICATIONS

Official Communication issued in corresponding UK Patent Application No. GB 1305523.1, mailed on May 1, 2014.
(Continued)

*Primary Examiner* — Robert Karacsony
(74) *Attorney, Agent, or Firm* — Keating & Bennett, LLP

(57) ABSTRACT

An RFID antenna is arranged in the vicinity of a metal portion of and on an outer surface side of a casing of a communication terminal device. The RFID antenna includes a magnetic core, and a coil conductor that is wound around the magnetic core. The coil conductor includes a first conductor portion positioned on a first main surface side of the magnetic core and a second conductor portion positioned on the second main surface side of the magnetic core and arranged at a different position than the first conductor portion when viewed in plan from the direction of the first and second main surfaces, and the coil conductor is arranged such that the first main surface side of the magnetic core is on the metal portion side and such that the first conductor portion of the coil conductor faces a leading end portion of the casing.

20 Claims, 8 Drawing Sheets

(51) Int. Cl.
*H01Q 1/52* (2006.01)
*H01Q 1/22* (2006.01)
*G06K 19/077* (2006.01)
*H01F 38/14* (2006.01)
*H04M 1/725* (2006.01)
*H04M 1/02* (2006.01)

(52) U.S. Cl.
CPC .............. *H01Q 7/06* (2013.01); *H04M 1/7253* (2013.01); *H04M 1/026* (2013.01); *H04M 2250/04* (2013.01)

(56) References Cited

U.S. PATENT DOCUMENTS

| | | | |
|---|---|---|---|
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,243,045 B1 | 6/2001 | Ishibashi | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,452,563 B1 | 9/2002 | Porte | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,956,481 B1 | 10/2005 | Cole | |
| 6,963,729 B2 | 11/2005 | Uozumi | |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 8,466,839 B2* | 6/2013 | Schlub et al. ................. 343/702 |
| 2001/0011012 A1 | 8/2001 | Hino et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0001031 A1 | 1/2005 | Akiho et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0162331 A1* | 7/2005 | Endo et al. .................... 343/788 |
| 2005/0232412 A1 | 10/2005 | Ichihara et al. | |
| 2005/0236623 A1 | 10/2005 | Takechi et al. | |
| 2005/0253726 A1 | 11/2005 | Yoshida et al. | |
| 2005/0275539 A1 | 12/2005 | Sakama et al. | |
| 2006/0001138 A1 | 1/2006 | Sakama et al. | |
| 2006/0028384 A1* | 2/2006 | Akiho et al. ................... 343/742 |
| 2006/0032926 A1 | 2/2006 | Baba et al. | |
| 2006/0044192 A1 | 3/2006 | Egbert | |
| 2006/0055531 A1 | 3/2006 | Cook et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244568 A1 | 11/2006 | Tong et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0015549 A1 | 1/2007 | Hernandez et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0200782 A1 | 8/2007 | Hayama et al. | |
| 2007/0205291 A1 | 9/2007 | Aramaki et al. | |
| 2007/0229276 A1 | 10/2007 | Yamagajo et al. | |
| 2007/0247387 A1 | 10/2007 | Kubo et al. | |
| 2007/0252700 A1 | 11/2007 | Ishihara et al. | |
| 2007/0252703 A1 | 11/2007 | Kato et al. | |
| 2007/0252763 A1 | 11/2007 | Martin | |
| 2007/0285335 A1 | 12/2007 | Bungo et al. | |
| 2007/0290928 A1 | 12/2007 | Chang et al. | |
| 2008/0024156 A1 | 1/2008 | Arai et al. | |
| 2008/0068132 A1 | 3/2008 | Kayanakis et al. | |
| 2008/0070003 A1 | 3/2008 | Nakatani et al. | |
| 2008/0087990 A1 | 4/2008 | Kato et al. | |
| 2008/0129606 A1 | 6/2008 | Yanagisawa et al. | |
| 2008/0143630 A1 | 6/2008 | Kato et al. | |
| 2008/0169905 A1 | 7/2008 | Slatter | |
| 2008/0184281 A1 | 7/2008 | Ashizaki et al. | |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0021352 A1 | 1/2009 | Kataya et al. | |
| 2009/0021446 A1 | 1/2009 | Kataya et al. | |
| 2009/0065594 A1 | 3/2009 | Kato et al. | |
| 2009/0066466 A1 | 3/2009 | Arimura | |
| 2009/0096696 A1 | 4/2009 | Joyce, Jr. et al. | |
| 2009/0109034 A1 | 4/2009 | Chen et al. | |
| 2009/0109102 A1 | 4/2009 | Dokai et al. | |
| 2009/0140947 A1 | 6/2009 | Sasagawa et al. | |
| 2009/0160719 A1 | 6/2009 | Kato et al. | |
| 2009/0201116 A1 | 8/2009 | Orihara | |

(56) References Cited

U.S. PATENT DOCUMENTS

| | | |
|---|---|---|
| 2009/0224061 A1 | 9/2009 | Kato et al. |
| 2009/0224882 A1* | 9/2009 | Sato .......................... 340/10.1 |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0186641 A1 | 8/2011 | Kato et al. |
| 2011/0253795 A1 | 10/2011 | Kato |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 477 927 A1 | 11/2004 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| EP | 2 418 729 A2 | 2/2012 |
| EP | 2 482 382 A1 | 8/2012 |
| GB | 2 305 075 A | 3/1997 |
| GB | 2461443 A | 1/2010 |
| GB | 2469209 A | 10/2010 |
| GB | 2484037 A | 3/2012 |
| GB | 2487491 A | 7/2012 |
| GB | 2488450 A | 8/2012 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-088586 A | 4/1996 |
| JP | 08-88586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-093029 A | 4/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-69533 A | 3/1998 |
| JP | 10-069533 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |

(56) References Cited

FOREIGN PATENT DOCUMENTS

| | | |
|---|---|---|
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166176 A | 6/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |

(56) References Cited

FOREIGN PATENT DOCUMENTS

| | | |
|---|---|---|
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-013120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-524942 A | 8/2007 |
| JP | 2007-228254 A | 9/2007 |
| JP | 2007-228325 A | 9/2007 |
| JP | 2007-233597 A | 9/2007 |
| JP | 2007-241789 A | 9/2007 |
| JP | 2007-266999 A | 10/2007 |
| JP | 2007-272264 A | 10/2007 |
| JP | 2007-287128 A | 11/2007 |
| JP | 2007-295177 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |

(56) References Cited

FOREIGN PATENT DOCUMENTS

| | | |
|---|---|---|
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111986 A | 5/2009 |
| JP | 2009-135166 A | 6/2009 |
| JP | 2009-153166 A | 7/2009 |
| JP | 2009-182630 A | 8/2009 |
| JP | 2009-213169 A | 9/2009 |
| JP | 2009-260758 A | 11/2009 |
| JP | 2009-284182 A | 12/2009 |
| JP | 2010-009196 A | 1/2010 |
| JP | 2010-050844 A | 3/2010 |
| JP | 2010-081571 | 4/2010 |
| JP | 4609604 B2 | 1/2011 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/020728 A1 | 2/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 20101026939 A1 | 3/2010 |
| WO | 2010/050361 A1 | 5/2010 |
| WO | 2010/079830 A1 | 7/2010 |

OTHER PUBLICATIONS

Official Communication issued in corresponding United Kingdom Patent Application No. 1305523.1, mailed on Nov. 7, 2013.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device"; U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Official Communication issued in International Patent Application No. PCT/JP2011/073490, mailed on Jan. 10, 2012.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.

(56) References Cited

OTHER PUBLICATIONS

Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless LC Device and Component for Wireless IC Device" U.S. Appl.No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.

(56) References Cited

OTHER PUBLICATIONS

Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.

Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2009/069486, mailed on Mar. 2, 2010.

(56) References Cited

OTHER PUBLICATIONS

Kato: "Radio IC Device"; U.S. Appl. No. 13/080,775, filed Apr. 6, 2011.

Kato et al.: "Antenna and Wireless IC Device"; U.S. Appl. No. 13/083,626, filed Apr. 11, 2011.

Official Communication issued in International Patent Application No. PCT/JP2009/070617, mailed on Mar. 16, 2010.

Nagai, "Mounting Technique of RFID by Roll-To-Roll Process", Material Stage, Technical Information Institute Co., Ltd, vol. 7, No. 9, 2007, pp. 4-12.

Dokai et al.: "Wireless IC Device"; U.S. Appl. No. 13/088,480, filed Apr. 18, 2011.

Kato et al.: "High-Frequency Device and Wireless IC Device"; U.S. Appl. No. 13/094,928, filed Apr. 27, 2011.

Dokai et al.: "Wireless IC Device"; U.S. Appl. No. 13/099,392, filed May 3, 2011.

Kato et al.: "Radio Frequency IC Device"; U.S. Appl. No. 13/163,803, filed Jun. 20, 2011.

Official Communication issued in International Patent Application No. PCT/JP2010/050170, mailed on Apr. 13, 2010.

Official Communication issued in International Patent Application No. PCT/JP2010/051205, mailed on May 11, 2010.

Kato: "Wireless IC Device, Wireless IC Module and Method of Manufacturing Wireless IC Module"; U.S. Appl. No. 13/169,067, filed Jun. 27, 2011.

Kato et al.: "Antenna and Wireless IC Device"; U.S. Appl. No. 13/190,670, filed Jul. 26, 2011.

Shiroki et al.: "RFIC Chip Mounting Structure"; U.S. Appl. No. 13/223,429, filed Sep. 1, 2011.

Official Communication issued in International Patent Application No. PCT/JP2010/056559, mailed on Jul. 27, 2010.

Taniguchi et al.: "Antenna Device and Radio Frequency IC Device"; U.S. Appl. No. 13/232,102, filed Sep. 14, 2011.

\* cited by examiner

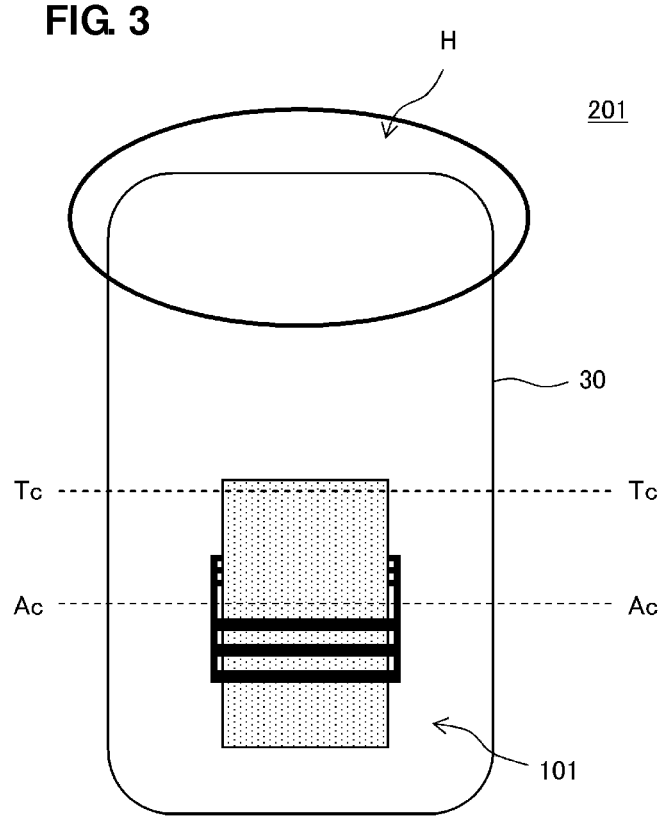

1:1

1:2

1:5

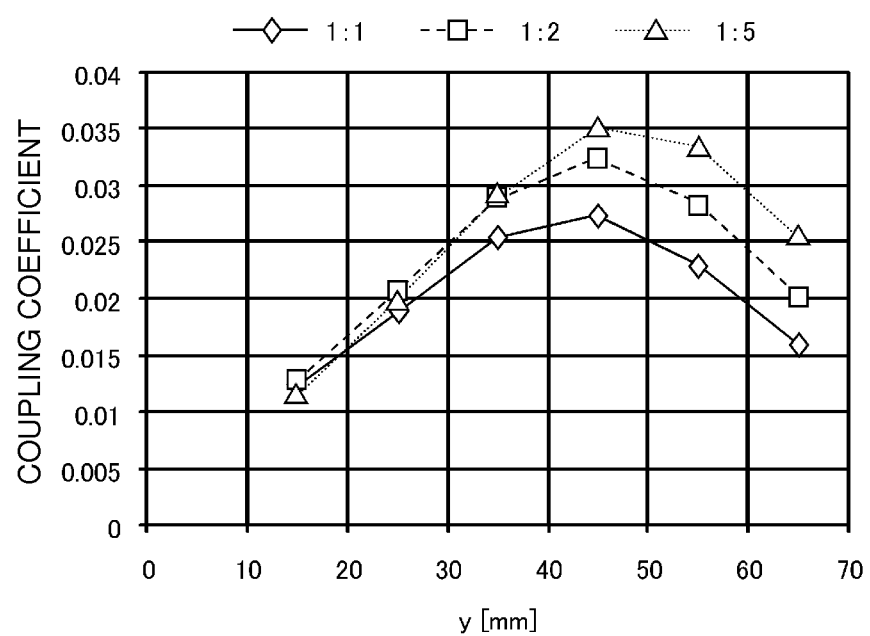

COMMUNICATION TERMINAL DEVICE

BACKGROUND OF THE INVENTION

1. Field of the Invention

The present invention relates to communication terminal devices that can be used in, for example, radio frequency identification (RFID) systems in which communication is performed with external appliances via electromagnetic signals.

2. Description of the Related Art

In recent years, RFID systems utilizing an HF band, of for example, 13.56 MHz have been widely used as FeliCa (registered trademark) and near field communication (NFC) systems. For example, an antenna device for an RFID system is disclosed in Japanese Patent No. 3975918.

FIG. 1 is a sectional view of an antenna device section of a communication terminal device 90 described in Japanese Patent No. 3975918. This antenna device includes an asymmetrically shaped coil in which the winding intervals at two positions that face each other across a central portion of the winding region of the coil 71 have been made to be different from each other. At a large winding interval side 71a, a magnetic body 72 is arranged on a surface of the coil 71 opposite to an input-unit-94-side surface, which faces an IC card 1, of the coil 71, and at a small winding interval side 71b, the magnetic body 72 is arranged on the input-unit-94-side surface, which faces the IC card, of the coil 71. A reader/writer circuit 50 is connected to the coil 71. The antenna device is arranged in an antenna housing concavity 97a formed in a metal case 97 and is protected by a resin member 98. The magnetic field distribution of the antenna device is a distribution whose asymmetricity is more pronounced on the side 71a at which the winding interval and the line width of the coil 71 are larger. Consequently, a preferable communication state can be secured in a direction orthogonal to a main surface of the antenna device.

However, in an antenna arranged such that two conductor portions, which face each other across the central portion of the winding region of the coil conductor, are wound around a magnetic core, since the actual direction of the winding center axis of the coil conductor is neither parallel to or nor orthogonal to the main surface of the magnetic core but is tilted, there has been a problem in that it has been difficult to orient the directivity in a predetermined direction.

The antenna device of Japanese Patent No. 3975918 illustrated in FIG. 1 includes an asymmetrically shaped coil in which the winding intervals at two positions that face each other across a central portion of the winding region of the coil have been made to be different from each other and thereby the direction of magnetic flux is controlled. It is assumed that this antenna device will perform communication at a very short distance such as in communication with an RFIC card. For example, in the case where a leading end of a cellular phone terminal is brought close to a reader/writer in order to perform communication between the cellular phone terminal and the reader/writer, an antenna device is arranged in a leading end portion of the casing of the cellular phone terminal.

However, usually, it is often the case that other functional components such as, for example, a GSM or CDMA cellular phone antenna are arranged in the cellular phone terminal. Therefore, there are often restrictions on the arrangement of an antenna device in the leading end portion inside the cellular phone terminal casing. In addition, when another functional component arranged in the leading end portion is a cellular phone antenna, there are cases where the closer the arrangement position of the antenna device is to the leading end portion, the more the antenna device affects the antenna characteristics of the cellular phone antenna. On the other hand, there are cases where, provided that the antenna device is arranged at a position that is spaced away from the cellular phone antenna, it can be ensured that the two antennas are isolated from each other, but depending on the size of the terminal device, the layout becomes difficult. In addition, there are cases where, along with there being restrictions on the layout on the antenna device, there are also restrictions on the directivity direction of the antenna device.

For example, in the case where the antenna device is arranged in a trailing end portion, which is another end portion on the opposite side to the leading end portion, the antenna gain at the time of use when the leading end of the cellular phone terminal is held over the reader/writer, is inevitably reduced.

In addition, in the case where two cellular phone terminals are brought close to each other in order to perform communication, communication is performed in a state where the leading end portions of the two terminals are brought close to each other, and the same problem also occurs in this case.

SUMMARY OF THE INVENTION

Preferred embodiments of the present invention provide a communication terminal device that includes an antenna device with which it is assumed that communication will be performed at a very short distance such as communication with an RFIC card, and in which it is unlikely that there will be restrictions on the layout and the directivity direction of the antenna device and in which, when there is an antenna of another communication system in a leading end portion of the casing, the characteristics of the antennas are affected negligibly or not at all.

A communication terminal device according to a preferred embodiment of the present invention includes a casing that includes a leading end portion, a metal portion defining at least a portion of the casing and a pair of main surfaces; and an antenna that includes a magnetic core that includes a first main surface and a second main surface, which oppose each other, and a coil conductor that is arranged on at least either of the first main surface and the second main surface of the magnetic core and is arranged close to the metal portion of the casing. The antenna is directed in a direction that is tilted toward a direction of the leading end portion from a direction perpendicular or substantially perpendicular to the main surfaces of the casing.

The coil conductor preferably includes a first conductor portion positioned on the first main surface side of the magnetic core, and a second conductor portion positioned on the second main surface side of the magnetic core and arranged at a different position than the first conductor portion when viewed in plan from a direction of the first and second main surfaces. The coil conductor is arranged such that the first main surface side of the magnetic core is on the metal portion side and such that the first conductor portion of the coil conductor faces the leading end portion.

Regarding the antenna, a position in the center of the coil conductor preferably is arranged farther toward a trailing end portion of the casing, which is an end portion on the side opposite to the leading end portion, than a position in the center of the casing in a longitudinal direction of the casing.

A preferred embodiment of the present invention is, for example, preferably used when another antenna, which is of a different communication system than the antenna, is also arranged in the vicinity of the leading end portion.

A portion of the casing in the vicinity of the leading end portion preferably is made of an insulating material.

The sizes of the magnetic core and the coil conductor are preferably chosen such that, for example, $A/3 \leq B \leq A/2$ is satisfied, where A is the length of the magnetic core and B is the length of the coil conductor in a longitudinal direction of the casing.

For example, $C<D/2$ is preferably satisfied, where C is the length of the first conductor portion and D is the length of the second conductor portion in a longitudinal direction of the casing.

According to various preferred embodiments of the present invention, even though the antenna device is not provided in the leading end portion of the casing of the communication terminal device, communication using the leading end portion of the communication terminal device can be practically performed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a plan view illustrating the positional relationship of an RFID antenna 101 inside a casing 30 of the communication terminal device 201.

FIG. 4A is a plan view of the RFID antenna 101 and FIG. 4B is a partial sectional view of the communication terminal device which includes the RFID antenna 101.

FIG. 10 illustrates the relationship between the positional relationships illustrated in FIGS. 5A and 5B in the first preferred embodiment between the reader/writer antenna 301 and the RFID antennas illustrated in FIGS. 9A-9C and the coupling coefficient between the reader/writer antenna 301 and the RFID antennas.

DETAILED DESCRIPTION OF THE PREFERRED EMBODIMENTS

First Preferred Embodiment

Figure 2A:
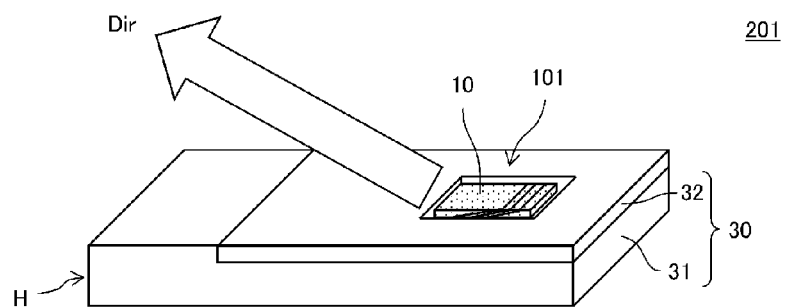
FIG. 2A is a perspective view of and FIG. 2B is a sectional view of a communication terminal device 201 of a first preferred embodiment of the present invention.
Figure 2B:
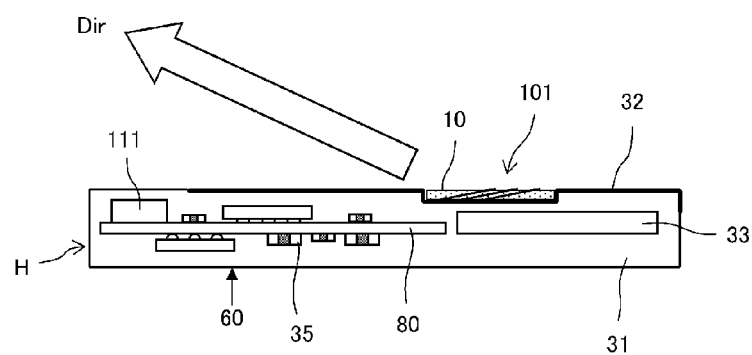

FIG. 2A is a perspective view of and FIG. 2B is a sectional view of a communication terminal device 201 according to a first preferred embodiment of the present invention. A casing 30 of the communication terminal device 201 includes two main surfaces, a resin portion 31 substantially including a resin material, and a metal portion 32 substantially including a metal material. Communication is performed by pointing an area in the vicinity of a leading end portion H of the casing 30 of the communication terminal device 201 toward a communication partner of an RFID antenna 101. The RFID antenna 101 is arranged in the vicinity of the metal portion 32 of the casing 30 and on an outer surface of the casing. The RFID antenna 101 preferably is for use in an RFID system antenna that utilizes a HF band of 13.56 MHz, for example.

In FIGS. 2A and 2B, the display side (input unit/display unit) 60 of the communication terminal device 201 is illustrated as facing downward. For example, a substrate (printed wiring board) 80 and a battery pack 33 are incorporated into the casing 30. A large number of components 35 are mounted on the front and back surfaces of the substrate 80. A cellular phone antenna 111 is arranged in the vicinity of the leading end portion H of the casing 30. An arrow Dir in FIGS. 2A and 2B roughly indicates a directivity direction of the RFID antenna 101, as will be described below.

The cellular phone antenna 111 preferably is a CDMA or GSM system cellular phone antenna having a band of, for example, 800 MHz, 900 MHz, 1.8 MHz or 1.9 MHz. The cellular phone antenna 111 preferably is a chip antenna in which a radiating electrode is provided on the outer surface of a dielectric block and is surface mounted on the substrate 80. The cellular phone antenna 111 is arranged in the resin portion 31 at a position not covered by the metal portion 32 of the casing 30. In other words, the metal portion 32 is provided in a region that does not cover an area in the vicinity of the cellular phone antenna 111. Thus, the cellular phone antenna 111 is not shielded by metal material of the metal portion 32.

The cellular phone antenna 111 is not limited to being a chip antenna, and, for example, may instead be an antenna manufactured by sheet metal working such as a planar inverted-F antenna. That is, it is sufficient that the cellular phone antenna 111 function as an antenna for the main system (for telephone calls, for example, of the cellular phone.

The cellular phone antenna 111 is arranged in the vicinity of the leading end portion H of the casing 30 and therefore is spaced apart from a position at which a person's hand holds the casing and so a reduction in the antenna gain of the cellular phone antenna 111 when a telephone call is made can be prevented. In addition, in clam-shell-type, swivel-type and straight-type cellular phone terminals, the cellular phone antenna 111 is arranged in the leading end portion of the side of the casing which the caller grips when the casing is in an extended state such that the cellular phone antenna 111 is spaced apart from the caller (person's body) and therefore coupling with the person's body is reduced. The arrangement position of the cellular phone antenna 111 is not particularly limited to being in the vicinity of the leading end portion H.

The metal portion 32 lies between the RFID antenna 101 and the cellular phone antenna 111 and therefore the two antennas only negligibly interfere with each other and the antenna characteristics of the respective antennas are secured.

In addition, the metal portion 32 also lies between the RFID antenna 101 and other constituent components of the communication terminal device 201 such as the battery pack 33 and the mounted components 35, and therefore the RFID antenna 101 and the constituent components only negligibly interfere with each other and their respective characteristics are secured.

In FIGS. 2A and 2B, for convenience of illustrating the RFID antenna 101, the RFID antenna 101 is illustrated as being exposed, but, as will be described below, an insulating cover sheet that covers the RFID antenna 101 is adhered to the front surface of the metal portion 32 of the casing 30.

FIG. 3 is a plan view illustrating the positional relationship of the RFID antenna 101 inside the casing 30 of the communication terminal device 201. A center Ac-Ac of the RFID antenna 101 lies at a position farther toward the trailing end (end portion on opposite side to leading end portion H) of the casing 30 than a center Tc-Tc of the casing 30 of the communication terminal device 201.

It is preferable that the RFID antenna 101 be arranged farther toward the trailing end than the center Tc-Tc of the casing 30, so that isolation of the cellular phone antenna 111 can be secured with certainty, but the arrangement is not limited to this. For example, provided that the RFID antenna 101 is arranged farther toward the trailing end side than any one of the functional components arranged in the leading end portion such as the cellular phone antenna 111, an effect is obtained that communication using the leading end portion of the communication terminal device can be practically performed even though the RFID antenna 101 is not provided in the leading end portion of the casing of the communication terminal device.

As functional components arranged in the leading end portion, other than the cellular phone antenna 111, a battery pack, a television antenna, a wireless module or a memory card, for example, can be arranged.

Figure 4A:
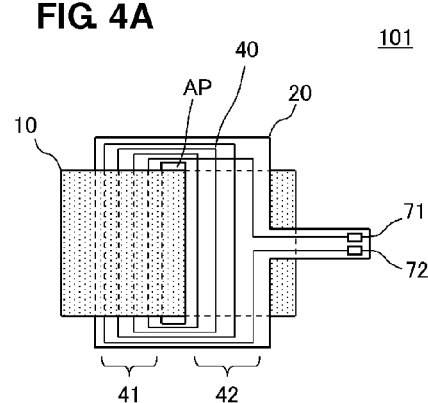
FIGS. 4A and 4B illustrate the structure of the RFID antenna 101 in detail, where
Figure 4B:
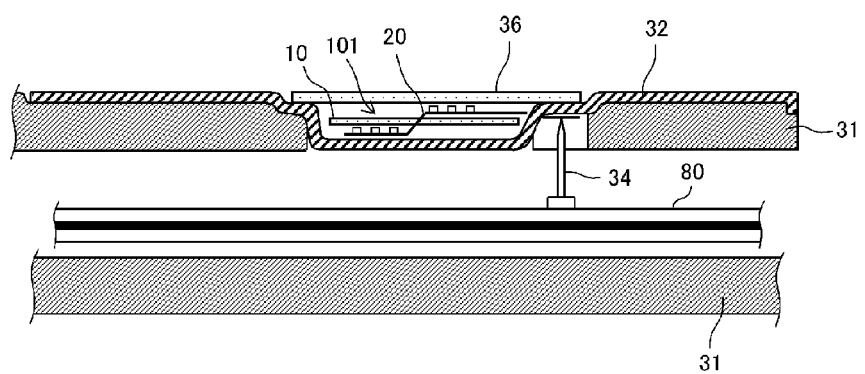

FIGS. 4A and 4B illustrate the structure of the RFID antenna 101 in detail, where FIG. 4A is a plan view of the RFID antenna 101 and FIG. 4B is a partial sectional view of the communication terminal device 201 which includes the RFID antenna 101.

As illustrated in FIG. 4A, the RFID antenna 101 includes a magnetic core 10 including a first main surface and a second main surface that oppose each other, and a coil conductor 40 that is wound around the magnetic core 10. The coil conductor 40 is located on a flexible substrate 20 and includes a first conductor portion 41 and a second conductor portion 42. An aperture AP, through which the magnetic core 10 is inserted, is provided in the flexible substrate 20. The two ends of the coil conductor 40 serve as input/output terminals 71 and 72. The magnetic core 10 preferably is a mixture of ferrite powder and a resin material arranged to have a rectangular or substantially rectangular parallelepiped shape or is a sintered ferrite plate, for example.

The coil conductor 40 includes the first conductor portion positioned on the first main surface side of the magnetic core 10 and the second conductor portion 42 positioned on the second main surface side of the magnetic core 10 and arranged at a different position than the first conductor portion 41 when viewed in plan from the direction of the first and second main surfaces. The RFID antenna 101 is arranged such that the first main surface side of the magnetic core 10 is on the metal portion 32 side and such that the first conductor portion 41 of the coil conductor 40 faces the leading end portion (left end in FIGS. 4A and 4B).

With this configuration, as illustrated by arrow Dir in FIGS. 2A and 2B, the RFID antenna 101 is directed in a direction that is tilted toward a direction of the leading end portion H from a direction perpendicular or substantially perpendicular to the main surface of the casing 30.

The substrate 80 inside the communication terminal device is provided with contact pins 34 and leading ends of the contact pins are in electrically conductive contact with the input/output terminals 71 and 72. Portions of the input/output terminals 71 and 72 of the flexible substrate 20 are interposed between the metal portion 32 and tips of the contact pins 34. A slit is preferably provided to allow portions (lead out portions) of the input/output terminals 71 and 72 of the flexible substrate 20 in the metal portion 32 to be lead into the inside of the casing.

A concavity is provided in the front surface of the metal portion 32 of the casing, the RFID antenna 101 is housed in this concavity and an insulating cover sheet 36 that covers the RFID antenna 101 is adhered to the front surface of the metal portion 32.

The metal portion 32 lies between the RFID antenna 101 and the substrate 80 and therefore the RFID antenna 101 is not electromagnetically coupled with, for example, the battery pack 33, the ground conductor of the substrate 80 and mounted components, and there is no mutual negative influence therebetween.

Figure 5A:
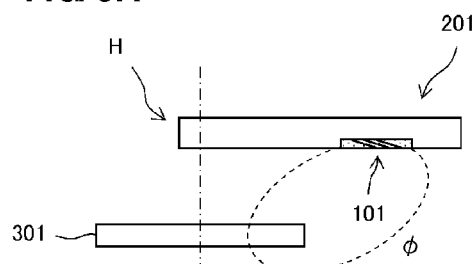
FIG. 5A and FIG. 5B illustrate examples of the positional relationship between the communication terminal device 201 and a reader/writer antenna 301, which is a communication partner.
Figure 5B:
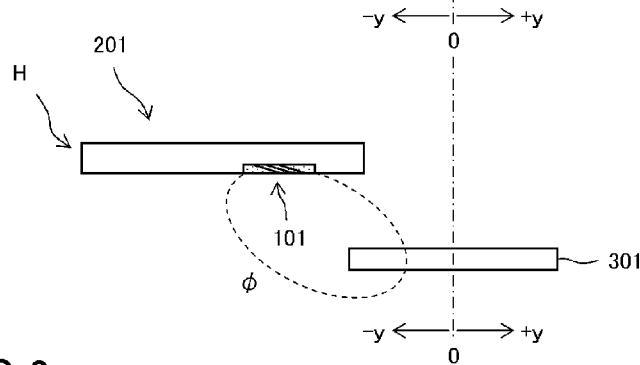

FIG. 5A and FIG. 5B illustrate examples of the positional relationship between the communication terminal device 201 and the reader/writer antenna 301, which is the communication partner of the RFID antenna 101. A broken line in the figure represents a typical loop of magnetic flux $\phi$. FIG. 5A illustrates a state in which the leading end portion H of the communication terminal device 201 is held at a position substantially in the center of the reader/writer antenna 301. In this state, the magnetic flux $\phi$ of the reader/writer antenna 301 links the reader/writer antenna 301 and the RFID antenna 101, and the reader/writer antenna 301 and the RFID antenna 101 are electromagnetically coupled with each other.

FIG. 5B illustrates a state in which the trailing end portion (on side opposite to leading end portion H) of the communication terminal device 201 is held at a position substantially in the center of the reader/writer antenna 301. Also in this state, the magnetic flux $\phi$ of the reader/writer antenna 301 links the reader/writer antenna 301 and the RFID antenna 101, and the reader/writer antenna 301 and the RFID antenna 101 are electromagnetically coupled with each other.

Figure 6:
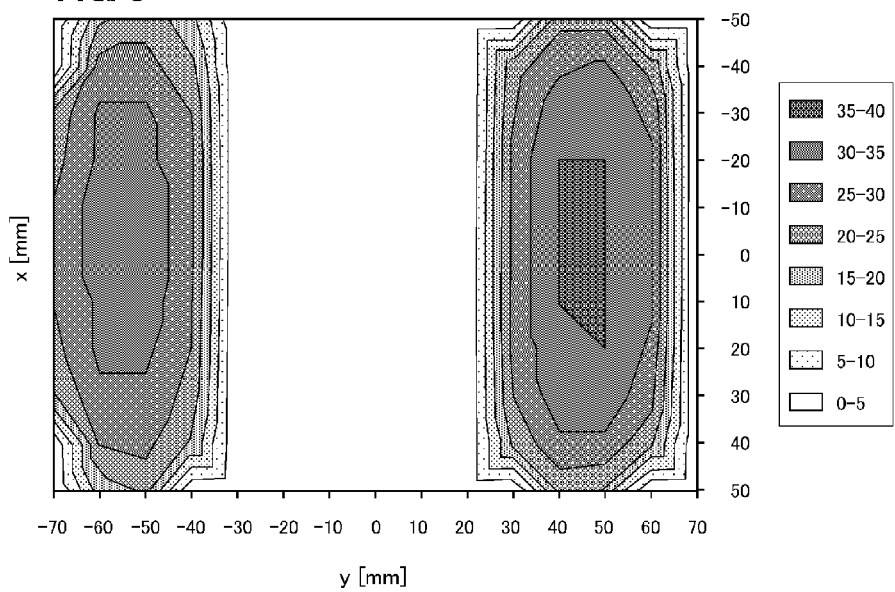
FIG. 6 illustrates the relationship between the positional relationships between the reader/writer antenna 301 and the RFID antenna 101 illustrated in FIGS. 5A and 5B and the gain of the RFID antenna 101.

FIG. 6 illustrates the relationship between the positional relationships between the reader/writer antenna 301 and the RFID antenna 101 illustrated in FIGS. 5A and 5B and the gain of the RFID antenna 101. The horizontal axis indicates the position along the y-axis direction illustrated in FIG. 5A and FIG. 5B, and a state in which the center of the RFID antenna 101 in the y-axis direction is located at the center of the reader/writer antenna 301 in the y-axis direction is taken to be y=0. The vertical axis indicates the position in a direction perpendicular or substantially perpendicular to the plane of the paper of FIG. 5A and FIG. 5B, and a state in which the center of the RFID antenna 101 in the x-axis direction is located at the center of the reader/writer antenna 301 in the x-axis direction is taken to be x=0.

In this example, preferably the dimension of the communication terminal device 201 in the y-axis direction (longitudinal direction) is about 100 mm and the distance from the leading end portion H of the casing 30 (refer to FIG. 3) to a position in the center of the RFID antenna 101 is about 60 mm, for example. In the first preferred embodiment, the peak gain is generated when y≈45 mm, for example. That is, in the state illustrated in FIG. 5A, when the distance from the reader/writer antenna 301 to a position in the center of the RFID antenna 101 is approximately 45 mm, that is, in a state where a position approximately 15 mm from the leading end portion H of the communication terminal device 201 (approximately 60 mm-approximately 45 mm) is held over the center of the reader/writer antenna 301, the peak gain is obtained.

Thus, in spite of the RFID antenna 101 being arranged farther toward the trailing end portion (held portion) of the casing of the communication terminal device 201 (that is, since a position in the center of the coil conductor 40 of the RFID antenna 101 is arranged farther toward the trailing end portion than a position in the center of the casing 30 in the longitudinal direction), communication can be performed by holding the leading end portion H over the reader/writer antenna 301.

In FIG. 6, a peak is also generated at a position of y≈−55 mm, for example, and this corresponds to the state illustrated in FIG. 5B.

Second Preferred Embodiment

Figure 7:
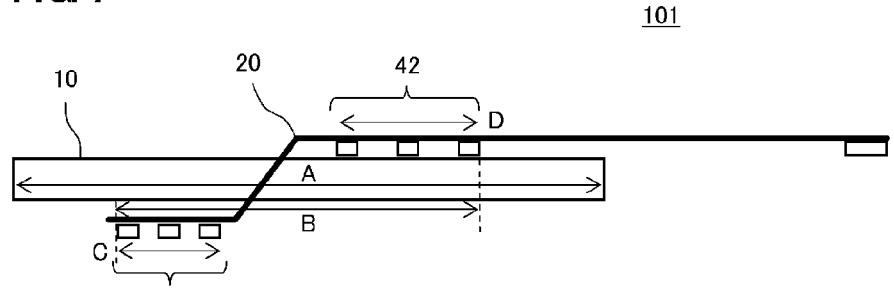
FIG. 7 is a partial sectional view of the RFID antenna 101.

In a second preferred embodiment of the present invention, the relationship between the sizes of the coil conductor and the magnetic core of the RFID antenna and the gain of the RFID antenna will be described. FIG. 7 is a partial sectional view of the RFID antenna 101. The configuration of the RFID antenna 101 is preferably the same as that described in the first preferred embodiment. In FIG. 7, the dimensions of the components are as follows.

A: length of magnetic core 10
B: width of coil conductor (length in y-axis direction)
C: width of first coil portion (length in y-axis direction)
D: width of second coil portion (length in y-axis direction)

Figure 8:
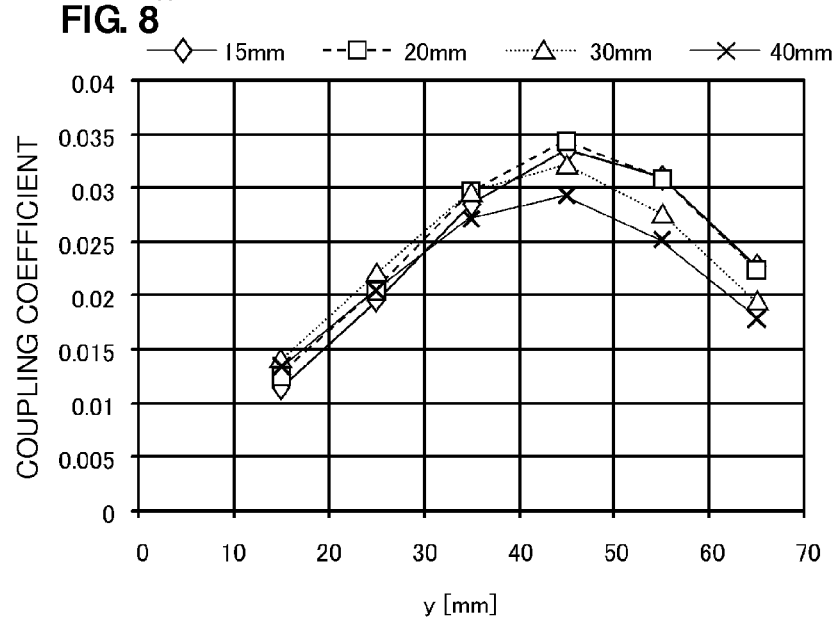
FIG. 8 illustrates the relationship between the positional relationships between the reader/writer antenna 301 and the RFID antenna 101 illustrated in FIG. 5A and FIG. 5B in the first preferred embodiment and the coupling coefficient between the reader/writer antenna 301 and the RFID antenna 101.

FIG. 8 illustrates the relationship between the positional relationships between the reader/writer antenna 301 and the RFID antenna 101 illustrated in FIG. 5A and FIG. 5B in the first preferred embodiment and the coefficient of coupling between the reader/writer antenna 301 and the RFID antenna 101. The horizontal axis indicates the position along the y-axis direction illustrated in FIG. 5A and FIG. 5B, and a state in which the center of the RFID antenna 101 in the y-axis direction is located at the center of the reader/writer antenna 301 in the y-axis direction is taken to be y=0. The vertical axis indicates the coefficient of coupling between the reader/writer antenna 301 and the RFID antenna 101. In FIG. 8, the dimension B (width of coil conductor) is taken as a parameter and the relationship between the coupling coefficient and the position in the y-axis direction is illustrated. The conditions with which these characteristics are obtained are as follows.

Magnetic Core 10
  length (dimension A)=about 40 mm
  width=about 20 mm
Coil Conductor
  width=about 24 mm
  Here, the gap between the reader/writer antenna 301 and the RFID antenna 101 is about 40 mm.

As is clear from FIG. 8, regardless of the dimension B (width of the coil conductor), the coupling coefficient peaks when the distance from the reader/writer antenna 301 (refer to FIG. 5A and FIG. 5B) to a position in the center of the RFID antenna 101 is approximately 45 mm, for example. The peak in the coupling coefficient is largest when the dimension B is approximately 20 mm, for example. When the dimension B is smaller or larger than approximately 20 mm, the peak of the coupling coefficient is reduced.

From this, it can be understood that large gain is obtained in the range A/3≤B≤A/2.

Third Preferred Embodiment

Figure 1:
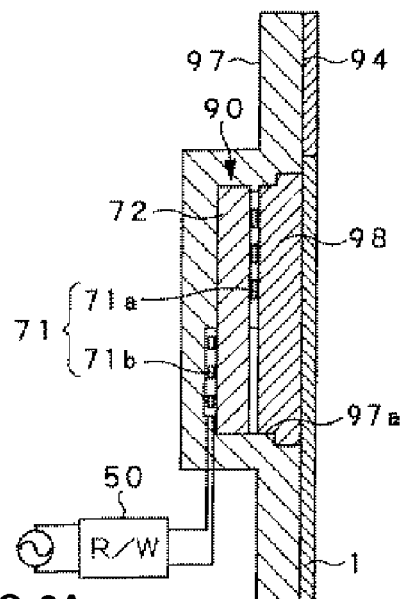
FIG. 1 is a sectional view of an antenna device section of a communication terminal device 90 described in Japanese Patent No. 3975918.
Figure 9A:
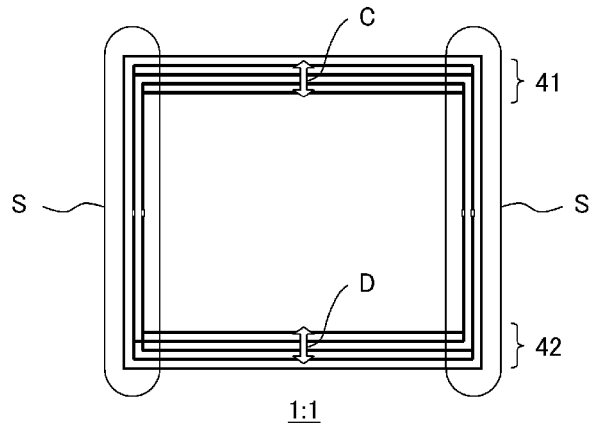
FIGS. 9A-9C are plan views illustrating three shapes for the coil conductor of the RFID antenna.
Figure 9B:
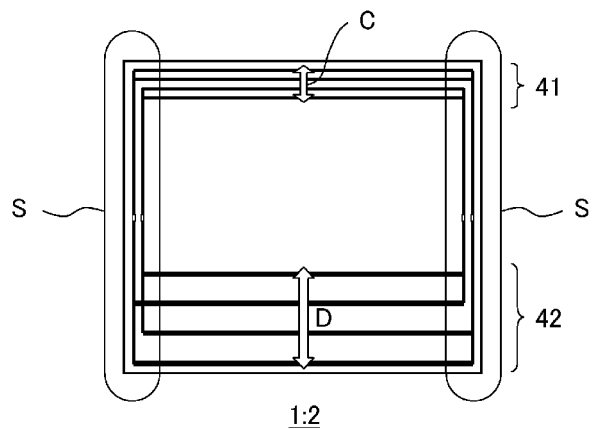
Figure 9C:
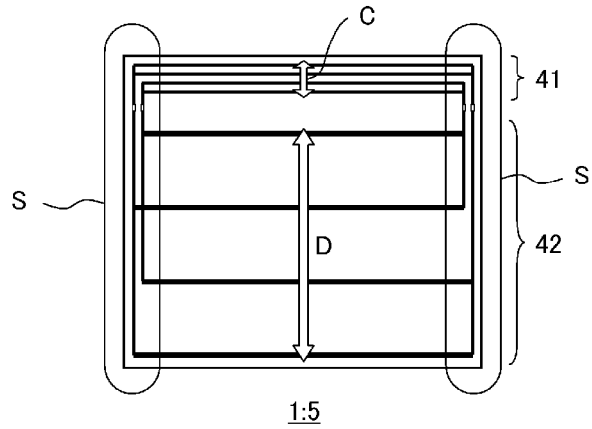

In a third preferred embodiment of the present invention, the relationship between the pattern of the coil conductor of the RFID antenna and the gain of the RFID antenna will be described. FIGS. 9A-9C are plan views illustrating three example shapes for the coil conductor of the RFID antenna. In FIGS. 9A-9C, the width C of the first conductor portion 41 is constant and the width D of the second conductor portion 42 is different in FIG. 9A, FIG. 9B and FIG. 9C. The ratio between the first conductor portion 41 and the second conductor portion 42 is 1:1 in the example illustrated in FIG. 9A, 1:2 in the example illustrated in FIG. 9B and 1:5 in the example illustrated in FIG. 9C.

In the first and second preferred embodiments, examples were described in which the coil conductor is formed on only one surface of the flexible substrate, whereas in the examples illustrated in FIGS. 9A-9C, both the first conductor portion 41 and the second conductor portion 42 are formed on both surfaces of the flexible substrate. In FIGS. 9A-9C, the coil conductor on the back surface of the flexible substrate is illustrated in a see-through manner. Connection portions S that connect the first conductor portion 41 and the second conductor portion 42 are also provided on both surfaces of the flexible substrate and are arranged at overlapping positions when viewed in plan, and therefore two patterns on the left and right are illustrated in FIGS. 9A-9C.

FIG. 10 illustrates the relationship between the positional relationships between the reader/writer antenna 301 illustrated in FIGS. 5A and 5B in the first preferred embodiment and the RFID antenna illustrated in FIGS. 9A-9C and the coefficient of coupling between the reader/writer antenna 301 and the RFID antenna. The horizontal axis indicates the position in the y-axis direction illustrated in FIG. 5A and FIG. 5B, and a state in which the center of the RFID antenna in the y-axis direction is located at the center of the reader/writer antenna 301 in the y-axis direction is taken to be y=0. The vertical axis indicates the coefficient of coupling between the reader/writer antenna 301 and the RFID antenna. In FIG. 10, the ratio between the first conductor portion 41 and the second conductor portion 42 is taken as a parameter and the relationship between the coupling coefficient and the position in the y-axis direction is illustrated. The conditions with which these characteristics are obtained are described in the second preferred embodiment.

As is clear from FIG. 10, regardless of the ratio between the first conductor portion 41 and the second conductor portion 42, the coupling coefficient peaks when the distance from the reader/writer antenna 301 (refer to FIG. 5A and FIG. 5B) to a position in the center of the RFID antenna 101 is approximately 45 mm, for example. The peak in the coupling coefficient is largest when the ratio between the first conductor portion 41 and the second conductor portion 42 is about 1:5, for example. The smaller this ratio is (the closer it is to 1:1), the more the coupling coefficient peak is reduced.

From this, it is clear that the larger the width D of the second conductor portion 42, the higher the coupling coefficient peak and the higher the gain obtained. At least, provided that the condition C<D/2 is satisfied, an effect of an improvement in antenna gain is obtained.

Fourth Preferred Embodiment

Figure 11A:
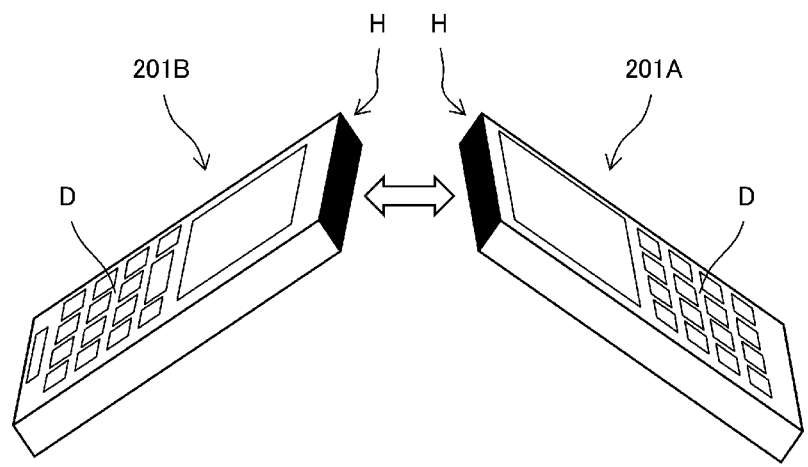
FIGS. 11A and 11B illustrate a situation in which communication is performed between communication terminal devices 201A and 201B.
Figure 11B:
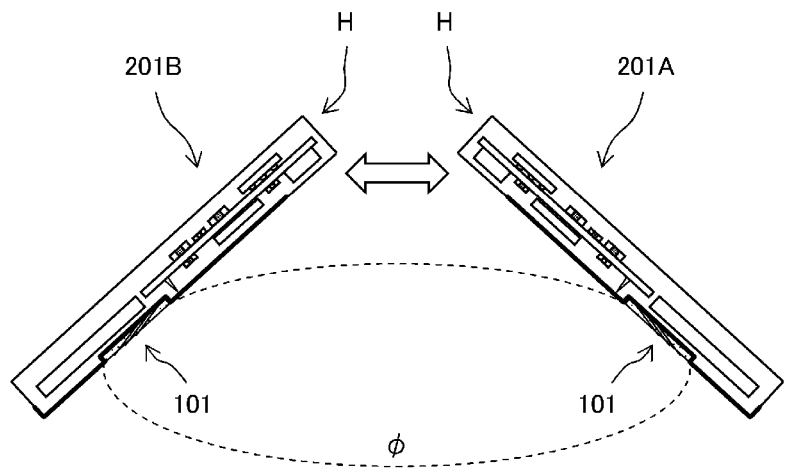

In a fourth preferred embodiment of the present invention, an example will be described of communication between communication terminal devices. FIGS. 11A and 11B illustrate a situation in which communication is performed between a communication terminal device 201A and a communication terminal device 201B. FIG. 11A is a perspective view illustrating a state in which communication is performed between the two communication terminal devices and FIG. 11B is a sectional view. The configuration of the two communication terminal devices 201A and 201B is preferably the same as any of those described in the first to third preferred embodiments. As illustrated in FIGS. 11A and 11B, communication is performed in a state in which the respective leading end portions H of the two communication terminal devices 201A and 201B have been brought close together.

In FIG. 11B, as illustrated by the broken line, magnetic flux φ, which passes through the magnetic cores of the RFID antennas 101 of the two communication terminal devices 201A and 201B, is generated. Consequently, communication can be performed with a method of use that makes it seem as though communication is being performed between the leading end portions of the two communication terminal devices 201A and 201B.

Other Preferred Embodiments

In each of the preferred embodiments of the present invention, as the RFID antenna 101, an RFID antenna has been preferably used that includes a first conductor portion that is positioned on the first main surface side of the magnetic core 10 and a second conductor portion 42 that is positioned on the second main surface side of the magnetic core 10 and is arranged at a different position than the first conductor portion 41 when viewed in plan from the direction of the first and second main surfaces, but the present invention is not limited to this. For example, a configuration may be adopted in which an RFID antenna is used that is oriented in a direction perpendicular or substantially perpendicular to the first main surface of the magnetic core 10 and the antenna is arranged so as to be tilted toward a direction of the leading end portion such that the antenna is directed in a direction that is tilted toward a direction of the leading end portion from a direction perpendicular or substantially perpendicular to a main surface of the casing. Considering, for example, the installation space of the RFID antenna 101 (in particular, the space in the thickness direction of the installation section), it is preferable that an RFID antenna be used that includes a first conductor portion positioned on the first main surface side of the magnetic core 10 and a second conductor portion 42 that is positioned on the second main surface side of the magnetic core 10 and is arranged at a different position than the first conductor portion 41 when viewed in plan from the direction of the first and second main surfaces.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
a casing that includes a leading end portion, a metal portion defining at least a portion of the casing, and a pair of main surfaces; and
an antenna that includes a magnetic core including a first main surface and a second main surface, which oppose each other, and a coil conductor that is arranged on at least either of the first main surface and the second main surface of the magnetic core and is arranged adjacent to the metal portion of the casing; wherein
the antenna is configured to have directivity direction that is tilted toward a direction of the leading end portion from a direction that is perpendicular or substantially perpendicular to the pair of main surfaces of the casing;
the coil conductor includes a first conductor portion positioned on a side of the first main surface of the magnetic core and a second conductor portion positioned on a side of the second main surface of the magnetic core and arranged at a different position than the first conductor portion when viewed in a direction perpendicular to the first and second main surfaces, and the coil conductor is arranged such that the side of the first main surface of the magnetic core is on a side of the magnetic core closer to the metal portion and such that the first conductor portion of the coil conductor faces the leading end portion; and
a position in a center of the coil conductor is arranged farther from the leading end portion toward a trailing end portion of the casing, which is an end portion on the side opposite to the leading end portion, than a position in a center of the casing in a longitudinal direction of the casing.

2. The communication terminal device according to claim 1, wherein another antenna, which belongs to a different communication system to the antenna, is also arranged in an area of the leading end portion.

3. The communication terminal device according to claim 1, wherein a portion of the casing in an area of the leading end portion is made of an insulating material.

4. The communication terminal device according to claim 1, wherein sizes of the magnetic core and the coil conductor are chosen such that $A/3 \leq B \leq A/2$ is satisfied, where A is a length of the magnetic core and B is a length of the coil conductor in a longitudinal direction of the casing.

5. The communication terminal device according to claim 4, wherein $C<D/2$ is satisfied, where C is a length of the first conductor portion and D is a length of the second conductor portion in a longitudinal direction of the casing.

6. The communication terminal device according to claim 1, wherein the antenna is an RFID antenna.

7. The communication terminal device according to claim 6, further comprising a cellular phone antenna.

8. The communication terminal device according to claim 7, wherein the casing includes a resin portion not covered by the metal portion, and the cellular phone antenna is provided in the resin portion.

9. The communication terminal device according to claim 8, wherein the metal portion is located between the RFID antenna and the cellular phone antenna.

10. The communication terminal device according to claim 8, further comprising a battery pack and mounted components, wherein the metal portion is located between the RFID antenna and the battery pack and the mounted components.

11. The communication terminal device according to claim 1, wherein the metal surface includes a concavity containing the antenna, and an insulating sheet is arranged to cover the antenna.

12. The communication terminal device according to claim 6, wherein the casing includes a substrate, and the metal portion is located between the RFID antenna and the substrate.

13. The communication terminal device according to claim 12, wherein the substrate is a printed wiring board and includes contact pins arranged to be electrically connected to input/output terminals.

14. The communication terminal device according to claim 13, wherein the antenna includes a substrate on which the coil conductor is located, and the input/output terminals are provided on the substrate.

15. The communication terminal device according to claim 14, wherein portions of the input/output terminals are located between the metal portion and the contact pins.

16. An RFID system comprising the communication terminal device according to claim 1.

17. The RFID system according to claim 16, wherein the antenna is an RFID antenna.

18. The RFID system according to claim 17, wherein the communication terminal device further comprises a cellular phone antenna.

19. A communication terminal device comprising:
 a casing that includes a leading end portion, a metal portion defining at least a portion of the casing, and a pair of main surfaces; and
 an antenna that includes a magnetic core including a first main surface and a second main surface, which oppose each other, and a coil conductor that is arranged on at least either of the first main surface and the second main surface of the magnetic core and is arranged adjacent to the metal portion of the casing; wherein
 the antenna is configured to have a directivity direction that is tilted toward a direction of the leading end portion from a direction that is perpendicular or substantially perpendicular to the pair of main surfaces of the casing; and
 sizes of the magnetic core and the coil conductor are chosen such that $A/3 \leq B \leq A/2$ is satisfied, where A is a length of the magnetic core and B is a length of the coil conductor in a longitudinal direction of the casing.

20. A communication terminal device comprising:
 a casing that includes a leading end portion, a metal portion defining at least a portion of the casing, and a pair of main surfaces; and
 an antenna that includes a magnetic core including a first main surface and a second main surface, which oppose each other, and a coil conductor that is arranged on at least either of the first main surface and the second main surface of the magnetic core and is arranged adjacent to the metal portion of the casing;
 wherein the antenna is configured to have a directivity direction that is tilted toward a direction of the leading end portion from a direction that is perpendicular or substantially perpendicular to the pair of main surfaces of the casing;
 the antenna is an RFID antenna;
 the casing includes a substrate, and the metal portion is located between the RFID antenna and the substrate;
 the substrate is a printed wiring board and includes contact pins arranged to be electrically connected to input/output terminals; and
 the antenna includes a substrate on which the coil conductor is located, and the input/output terminals are provided on the substrate of the antenna; and
 wherein portions of the input/output terminals are located between the metal portion and the contact pins.

\* \* \* \* \*